United States Patent
Yamazaki et al.

(10) Patent No.: US 6,940,204 B2
(45) Date of Patent: Sep. 6, 2005

(54) BRUSHLESS MOTOR AND HERMETIC COMPRESSOR ASSEMBLY INCLUDING THE SAME MOTOR

(75) Inventors: Akihiko Yamazaki, Takefu (JP); Shinichi Okuyama, Takefu (JP); Yasutake Seki, Sabae (JP); Hiroshi Murakami, Suita (JP); Hisakazu Kataoka, Takefu (JP); Osaaki Morino, Takefu (JP); Yasuharu Odachi, Kariya (JP); Ken Suitou, Kariya (JP)

(73) Assignees: Matsushita Electric Industrial Co., Ltd. (JP); Kabushiki Kaisha Toyota Jidoshokki (JP)

( * ) Notice: Subject to any disclaimer, the term of this patent is extended or adjusted under 35 U.S.C. 154(b) by 51 days.

(21) Appl. No.: 10/609,473

(22) Filed: Jul. 1, 2003

(65) Prior Publication Data

US 2004/0004408 A1 Jan. 8, 2004

(30) Foreign Application Priority Data

Jul. 3, 2002 (JP) ....................................... 2002-194020

(51) Int. Cl.⁷ ................................................ H02K 3/04
(52) U.S. Cl. ......................... 310/208; 310/179; 310/254
(58) Field of Search ................................ 310/201–208, 310/179, 184, 254, 261

(56) References Cited

U.S. PATENT DOCUMENTS

| | | | |
|---|---|---|---|
| 744,145 A | 11/1903 | Wiard | |
| 3,531,672 A | 9/1970 | King | ............................ 310/180 |
| 4,619,040 A | 10/1986 | Wang et al. | .................... 29/596 |
| 4,908,541 A | 3/1990 | Kawazoe et al. | ............ 310/270 |
| 5,990,592 A | * 11/1999 | Miura et al. | ............ 310/156.53 |
| 6,049,154 A | * 4/2000 | Asao et al. | ................... 310/201 |
| 6,320,347 B1 | * 11/2001 | Sakamoto | .................... 318/685 |

FOREIGN PATENT DOCUMENTS

| | | |
|---|---|---|
| DE | 197 34 592 C1 | 10/1998 |
| FR | 2 670 246 | 6/1992 |
| FR | 2 803 127 | 6/2001 |
| JP | 55-157948 | 12/1980 |
| JP | 62-107660 | 5/1987 |
| JP | 2-221688 | 9/1990 |
| JP | 2001-145313 | 5/2001 |
| JP | 2001-218439 | 8/2001 |
| JP | 2002-162151 | 6/2002 |
| JP | 2002342351 A | 11/2002 |
| JP | 2003031937 A | 1/2003 |
| JP | 2004010198 A | 1/2004 |

* cited by examiner

Primary Examiner—Thanh Lam
(74) Attorney, Agent, or Firm—Steptoe & Johnson LLP

(57) ABSTRACT

A low-vibration/noise brushless motor capable of limiting the height of coil ends, and a low-current-leak hermetic compressor includes the brushless motor. This brushless motor is of a three-phase full-pitch-winding type including a stator having coils (20) inserted in slots in a one coil per one slot manner. Coil ends (21) of the coils (20) are arranged such that the first coil (201) is arranged outside the second and third coils (202, 203) in a place (A) where the second and third coils (202, 203) are inserted in a pair of slots adjacent to each other, the second coil (202) is arranged from inside of the first coil (201) to outside of the third coil (203) in a place (B) where the first and third coils are inserted in another pair of slots adjacent, and the third coil (203) is arranged inside the first and second coils (201, 202) in a place (C) where the first and second coils (201, 202) are inserted in still another pair of adjacent slots. The coil ends (21) are shaped in the axial direction.

21 Claims, 15 Drawing Sheets

18-SLOT

32-SLOT

BRUSHLESS MOTOR AND HERMETIC COMPRESSOR ASSEMBLY INCLUDING THE SAME MOTOR

FIELD OF THE INVENTION

The present invention relates to a small-size, low-vibration/noise brushless motor for driving an air conditioner fan and the like, and to be mounted in refrigerators, motor vehicles and other various machines, and to an hermetic compressor including the same motor.

BACKGROUND OF THE INVENTION

The challenge to reduce the size of a machine and vibrations/noise generated in the machine is an essential object to be attained in the development of the machine, and developers of machines including hermetic compressors are naturally confronted with such a challenge.

In the development of an electric motor, reducing the overall height of a stator constituting the motor is a means for achieving reduction in size. In a stator with short-pitch concentrically distributed windings such as shown in FIG. 14, the height of coil ends is limited in such a manner that coils 20 are shaped in the axial direction after the coils 20 have been inserted in slots of a stator core 10.

Another example of size reduction means is a stator with concentrated windings. The use of this type of stator has been increased because there has also been a demand for increasing the efficiency of electric motors. In the case of this type stator, coils are directly wound around teeth with resin insulators for electrical insulation interposed therebetween and, therefore, the height of the coil ends can be effectively reduced. The use of electric motors with this type of stator in hermetic compressors and other machines has been rapidly increased in recent years.

Alternative refrigerants, which do not destroy the ozone layer, and which are R134a, etc., have been used in hermetic compressors in attempts to solve environmental problems in recent years. However, the electrical conductivity of R134a is higher than those of the conventional refrigerants, so that the leak current from the coil ends of the electric motor exposed to R134a is increased. Therefore, a brushless motor with concentrated windings having a reduced coil end height that is a reduced area of exposure to R134a, in particular, is used markedly effectively as the hermetic compressors using the refrigerant R134a.

A sinusoidal wave driving system is an effective means for reducing vibration and noise from an electric motor. Another vibration/noise reduction means is to use distributed windings capable of generating smoothly formed magnetic fields.

Also, there are many instances of use of full-pitch windings in power generators. For example, Japanese Unexamined Patent Publication No. 55-157948 discloses such windings.

Further, Japanese Unexamined Patent Publication No. 62-107660 discloses a technique related to a manufacturing method of the windings. This technique is used to shape coils after insertion of the coils so that the size of the coil end in the radial direction is substantially equal to the thickness of the wiring forming the coils, and the purpose of this technique is to effectively dissipate heat produced by a power generator (for example, the description in the publication, page 3, from line 15 in the upper right section to line 4 in the lower left section under the caption "Object of the Invention") and, to achieve this object, the coil end inwardly bent in the radial direction of the stator (for example, the description in the publication, page 5, from line 6 to line 8 in the upper right section) is made straight by being shaped in the radial direction of the stator (for example, the description in the publication, page 5, at line 9 in the upper right section) by a manufacturing apparatus described with reference to "FIG. 10" in this publication.

Japanese Unexamined Patent Publication No. 2-221688 discloses a brushless motor having a stator with three-phase full-pitch windings in the three phases, in which coils are inserted in slots in a one coil per one slot manner, and an hermetic compressor including the motor (for example, the description in the publication, from line 14 in the lower right section of page 2 to line 3 in the upper left section of page 3, and "FIG. 1" or "FIG. 2 in this publication).

In a stator having a coil arrangement similar to that in the above-described stator having short-pitch or full-pitch concentrically distributed windings, i.e., a coil arrangement in which one coil is inserted in one slot and other coils are inserted in two adjacent slots, in other words, in a coil configuration in which, on the opposite sides of the coil end of one coil, the coil ends of other coils are concentrically arranged (regardless of whether each of these coils is of the same phase or not), the adjacent coil ends contact each other and change in shape of the coil ends in a direction along which the coils are arranged is limited, so that the height of the coil ends cannot be reduced.

Also, an electric motor having a stator with concentrated windings (hereinafter referred to as "concentrated-winding motor") can be reduced in coil end height, but has a problem that vibrations are increased due to its winding configuration.

As means for solving this problem, a sinusoidal wave driving system may be used in place of a conventional rectangular wave driving system for a concentrated-winding motor. In the sinusoidal wave driving system, however, switching is performed with an increased frequency and the effect of reducing the leak current by using concentrated windings is reduced to half in an atmosphere such as of R134a which provides high electrical conductivity.

In an hermetic compressor having a motor driven by this system, therefore, it is necessary to maintain a sufficiently large insulation distance from a housing. Thereby, the reduction in size of the hermetic compressor is limited.

Now, it is apparent that if the coil ends of full-pitch winding are shaped only in the radial direction of the stator, the height of the coil ends in the axial direction is increased.

DISCLOSURE OF THE INVENTION

In view of the above-described problems, an object of the present invention is to provide a low-vibration/noise brushless motor capable of limiting the height of the coil ends, and a low-current-leak hermetic compressor including the brushless motor.

To achieve the above-described object, according to one aspect of the present invention, there is provided a brushless motor formed with full-pitch windings in three phases, comprising a stator having coils inserted in slots in a one coil per one slot manner, coil ends of the coils being arranged on an end surface of the stator core in such a manner that: the first coil is located outside the second and third coils, in a place where the second and third coils are inserted in a pair of slots adjacent to each other; the second coil is located from inside of the first coil to outside of the third coil, in a place where the first and third coils are inserted in another pair of adjacent slots; and the third coil is located inside the first and second coils, in a place where the first coil and second coils are inserted in still another pair of adjacent slots, the coil ends being shaped in the axial direction of the stator. This coil arrangement and the coil end rising portion structure specific to the wave-winding coil insertion allow the coil ends to have increased shapability, and the brushless motor to be formed as a low-vibration motor having a reduced coil end height.

The brushless motor of the present invention is a three-phase full-pitch-winding brushless motor, and the stator of the motor comprises a stator core having a yoke, teeth, and slots each formed between a pair of adjacent teeth, the teeth being three times in number of poles of the rotor, wherein the coils of each phases are inserted in the slots in a one coil per one slot manner, the coils having coil ends shaped in the axial direction of the stator, so that the brushless motor can have a low vibration/noise characteristic and a reduced coil end height in the axial direction.

Also, the coil ends of each phases are arranged on an end surface of the stator core in such a manner that: the first coil is located outside the second and third coils in a place where the second and third coils are inserted, in a pair of adjacent slots; the second coil is located from inside of the first coil to outside of the third coil, in a place where the first and third coils are inserted in another pair of adjacent slots; and the third coil is located inside the first and second coils, in a place where the first coil and second coils are inserted in still another pair of adjacent slots. The second coil end is arranged as described above so as to regulate the direction of change in shape of the first and third coils, allowing shaping of the coil ends to be performed with efficiency. Thus, the coil ends are shaped to have a reduced height in the axial direction.

Also, the motor may be formed as a full-pitch-winding brushless motor. This construction and the coil end rising portion structure specific to the wave-winding coil insertion increase the amounts by which the shapes of the coil ends can be changed, and allow the coil ends to be reduced in height in the axial direction.

The brushless motor may be such that the rotor has six poles and the stator has eighteen slots. With the motor having six poles, it becomes possible to operate the hermetic compressor efficiently at a reduced vibration/noise level while maintaining a suitable number of revolutions of the motor. Also, with the eighteen slots which correspond to the least number of slots for six-pole three-phase full-pitch windings, it becomes possible to maximize the regions in the slots in which the windings can be formed to achieve high-efficiency winding. Further, by minimizing the number of coil bundles, the coil ends can be formed with higher shapability and the brushless motor can be formed as a small low-vibration/noise brushless motor capable of operating with high efficiency.

The above-described brushless motor may be driven by sinusoidal wave driving to operate with a low vibration level.

According to another aspect of the present invention, there is provided a machine in which the above-described brushless motor is mounted, and which can be formed as a small low-vibration/noise machine.

According to still another aspect of the present invention, there is provided an hermetic compressor including the above-described brushless motor. The leak current from the coil ends in this hermetic compressor can be reduced, so that a space for insulation from a hermetically sealed housing can be reduced.

The refrigerant used in the above-described hermetic compressor is R134a, so that the leak current from the coil ends can be limited.

According to still another aspect of the present invention, there is provided a machine in which the above-described hermetic compressors is mounted, and which can be formed as a small low-vibration/noise machine.

DESCRIPTION OF THE EMBODIMENTS

Figure 1:
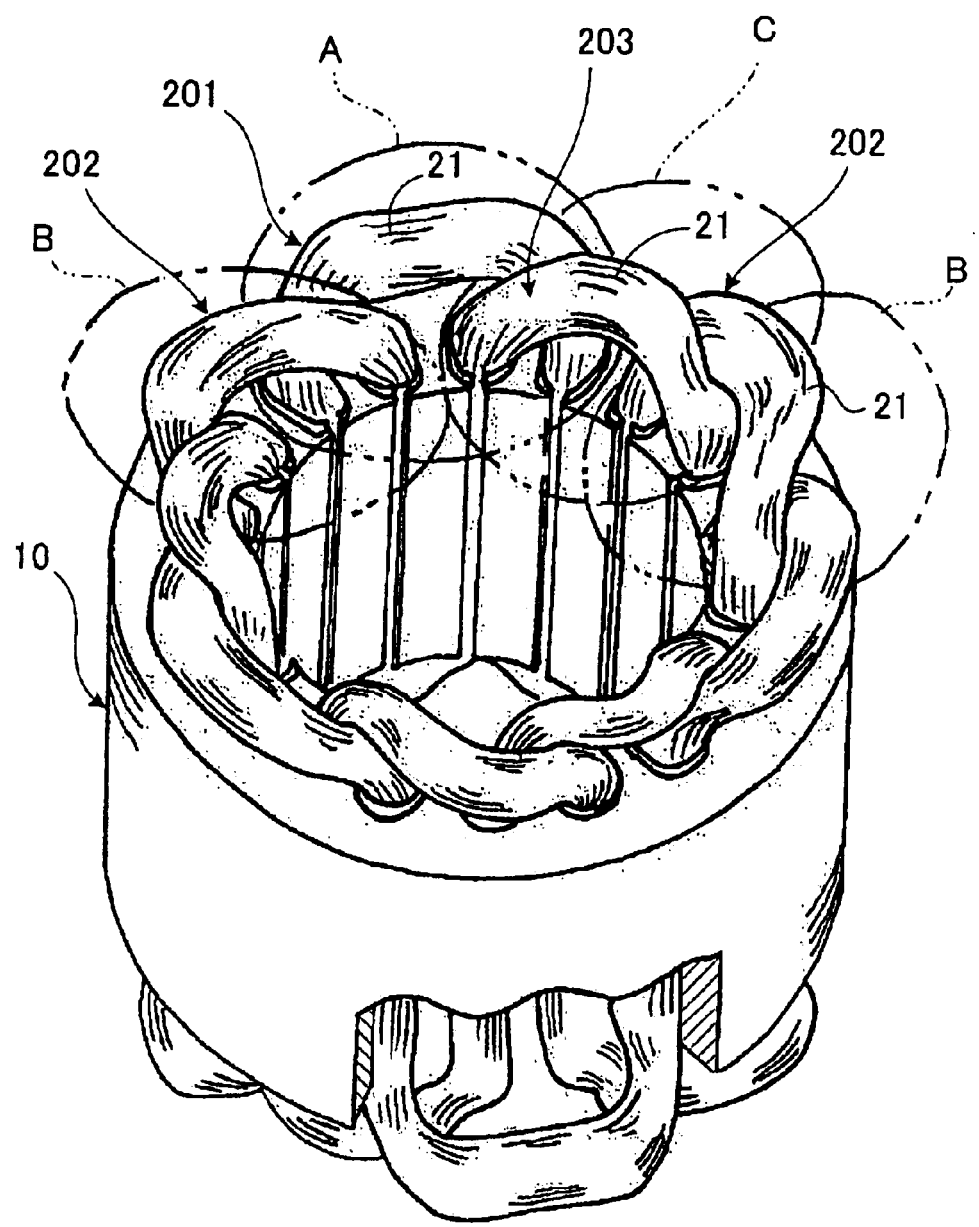
FIG. 1 is a partially cutaway perspective view showing coil arrangement in a three-phase full-pitch-winding brushless motor having six poles and eighteen slots, according to the present invention.
Figure 15:
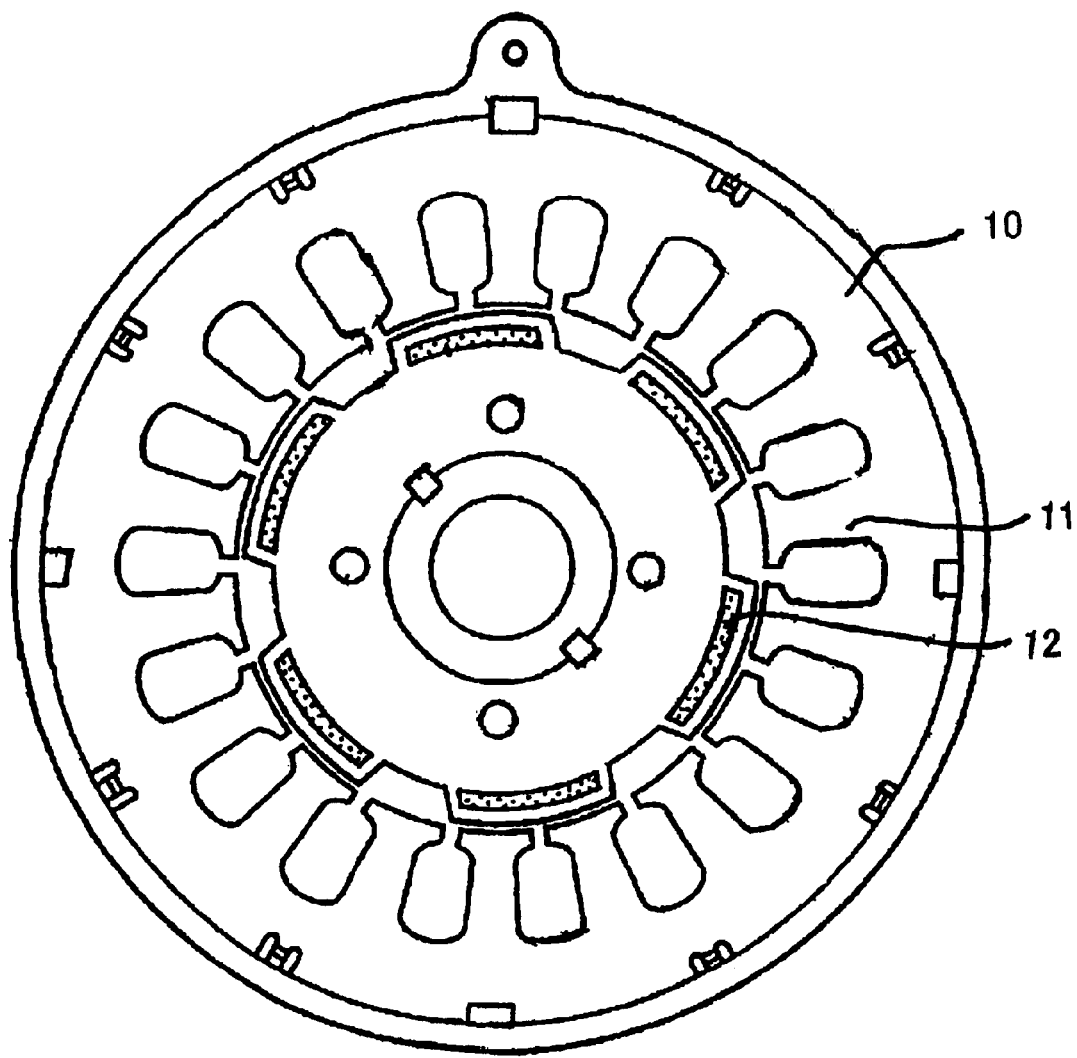
FIG. 15 is a diagram showing teeth present in three times the number of pole elements.

Embodiments of the present invention will be described with reference to FIGS. 1 through 13.
(Embodiment 1)
FIG. 1 shows the arrangement of coils of a stator in a three-phase full-pitch-winding brushless motor in which the number of poles of a rotor is 6 and the number of slots in the stator is 18. FIG. 15 shows stator 10 including eighteen teeth 11 and six pole elements 12.

Coil ends of the coils corresponding to the phases are arranged on a stator core end surface as described below. In a place where a second coil 202 and a third coil 203 are inserted in slots 11 adjacent to each other (hereinafter referred to as "place A" indicated by a symbol "A" in FIG. 1), a first coil 201 is located outside the second coil 202 and the third coil 203. In a place where the first coil 201 and the third coil 203 are inserted in slots 11 adjacent to each other (hereinafter referred to as "place B" indicated by a symbol "B" in FIG. 1), the second coil 202 is located from inside of the first coil 201 to outside of the third coil 203. In a place where the first coil 201 and the second coil 202 are inserted in slots 11 adjacent to each other (hereinafter referred to as "place C" indicated by a symbol "C" in FIG. 1), the third coil 203 is located inside the first coil 201 and the second coil 202. (This arrangement will be referred to as "coil arrangement of the present invention".)

Figure 3:
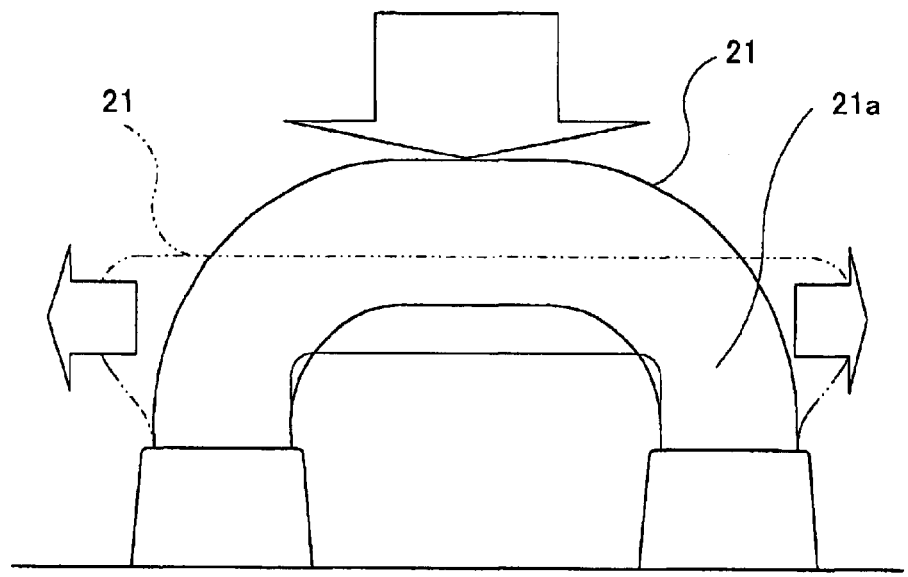
FIG. 3 is a diagram showing shaping of coil ends in the axial direction according to the present invention.

Shaping of the coil ends in the axial direction is performed so that rising portions 21a of each coil end 21 indicated mainly by the solid line in FIG. 3 are displaced to left and right as the coil end 21 indicated by the double-dot dash line is reduced in height. Therefore, the result of whether the shaping is satisfactory or unsatisfactory depends on how the coil ends are extended in left and right regions.

Figure 14:
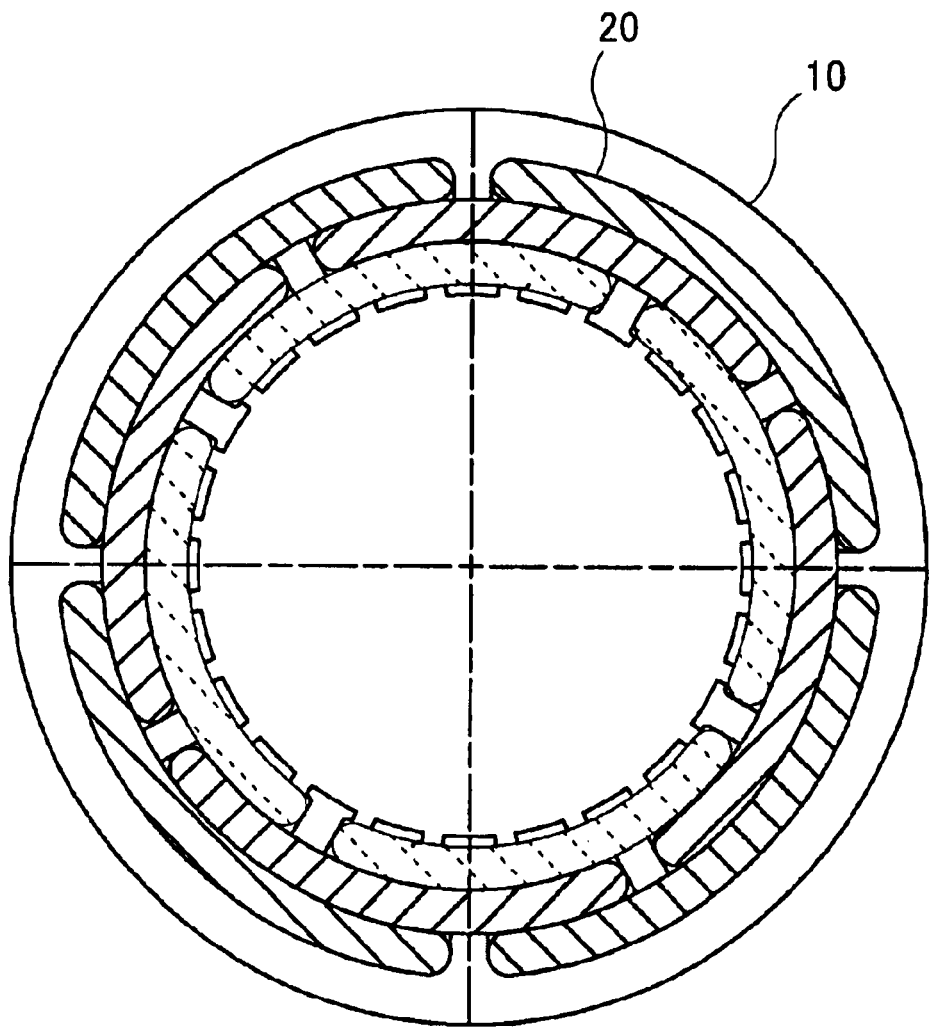
FIG. 14 is a diagram showing coil arrangement in a conventional three-phase short-pitch concentric-winding brushless motor.

In the conventional short-pitch concentrically distributed windings shown in FIG. 14, coils 20 are concentrically arranged and two coil ends exist concentrically on the left and right sides of one coil end, so that the left and right regions required in shaping by the above-described shaping mechanism are limited.

In the coil arrangement of the present invention, the existence of each place B is a feature relating to shaping. In each of the places A and C, the coil ends contact each other so that the change in their shapes in the direction of contact is limited, as in the case of the above-described short-pitch concentrically distributed windings. However, the place B exists on one side of each adjacent pair of places A and C without exception. The effect of the coil configuration in the place B is as described below. The first coil 201 and the third coil 203 are shaped while being guided by the second coil 202 smoothly formed from the inside-diameter side to the outside-diameter side, so that the first coil 201 expands on the outside-diameter side and the third coil expands on the inside-diameter side. The places B have a role to increase the regions for shaping of the entire coils in comparison with shaping regions in the conventional art shown in FIG. 14.

In the three-phase system of the above-described brushless motor, each of the first, second and third coils may be any one of the first phase (U-phase), the second phase (V-phase) and the third phase (W-phase). For example, the phase of the first coil is not limited to the first phase.

(Embodiment 2)

Another embodiment of the present invention will be described, which is a three-phase full-pitch-winding brushless motor in which the number of poles of a rotor is 4 and the number of slots in a stator is 12.

Figure 4:
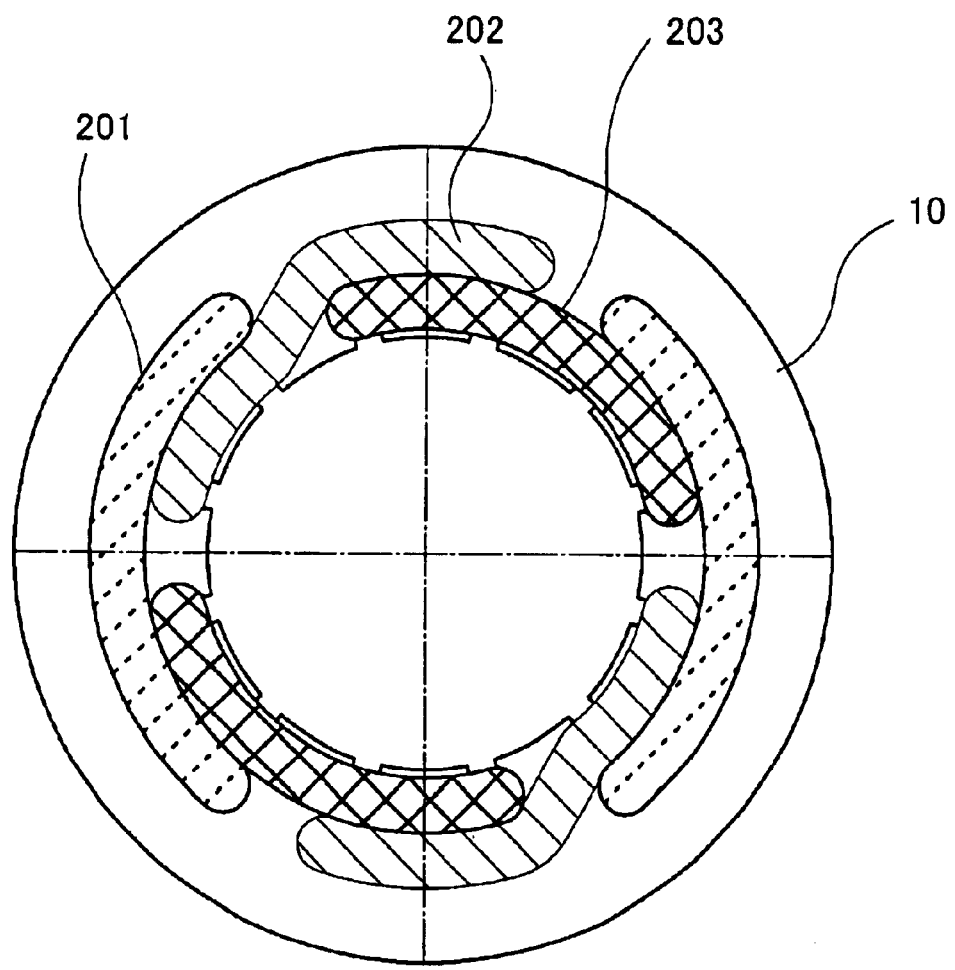
FIG. 4 is a diagram showing coil arrangement in a four-pole twelve-slot rotor according to the present invention.
Figure 5:
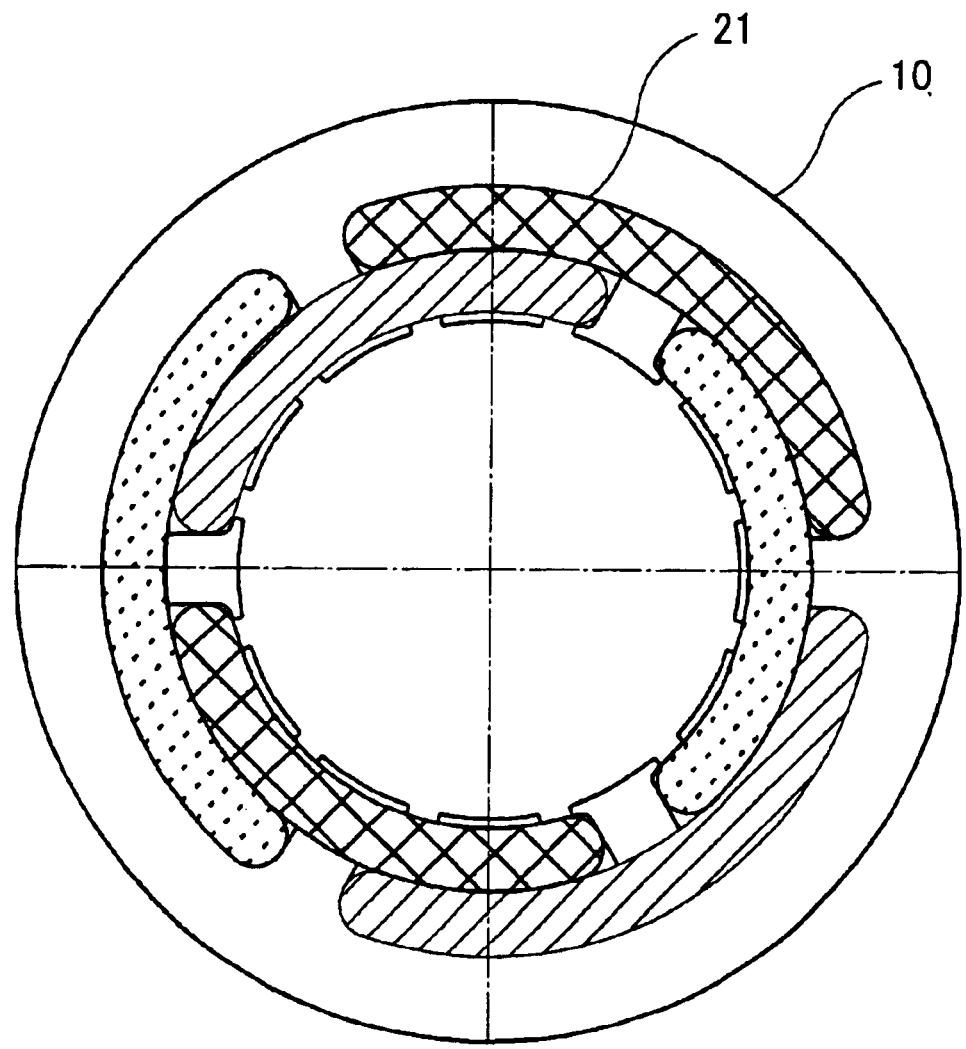
FIG. 5 is a diagram showing coil arrangement for four-pole twelve-slot full-pitch concentric windings in a conventional product.

FIG. 4 is a diagram showing the coil arrangement of the present invention in the three-phase full-pitch-winding brushless motor having four poles and twelve slots. FIG. 5 shows an example of a conventional three-phase full-pitch-winding brushless motor having four poles and twelve slots (a brushless motor having a configuration described in Japanese Patent Laid-Open No. 2-221688).

In the conventional motor shown in FIG. 5, the coils are concentrically arranged and two coil ends exist concentrically on the left and right sides of one coil, as in the case of the short-pitch concentrically distributed windings described above with reference to FIG. 14. Therefore, the left and right regions required in shaping the above-described shaping mechanism are limited.

FIG. 4 shows an arrangement in accordance with the above-described "coil arrangement of the present invention", in which the place B exists on one side of each adjacent pair of places A and C without exception. A function described below is performed by using the coil configuration in the place B. The first coil 201 and the third coil 203 are shaped while being guided by the second coil 202 smoothly formed from the inside-diameter side to the outside-diameter side, so that the first coil 201 expands on the outside-diameter side and the third coil 203 expands on the inside-diameter side. The above-described "coil arrangement of the present invention" ensures that the regions for shaping of the entire coils are increased differently from shaping regions in the conventional art shown in FIG. 5.

(Embodiment 3)

A method of manufacturing windings in the above-described (Embodiment 1) three-phase full-pitch-winding brushless motor having six poles and eighteen slots, particularly windings on the stator will next be described.

Figure 6:
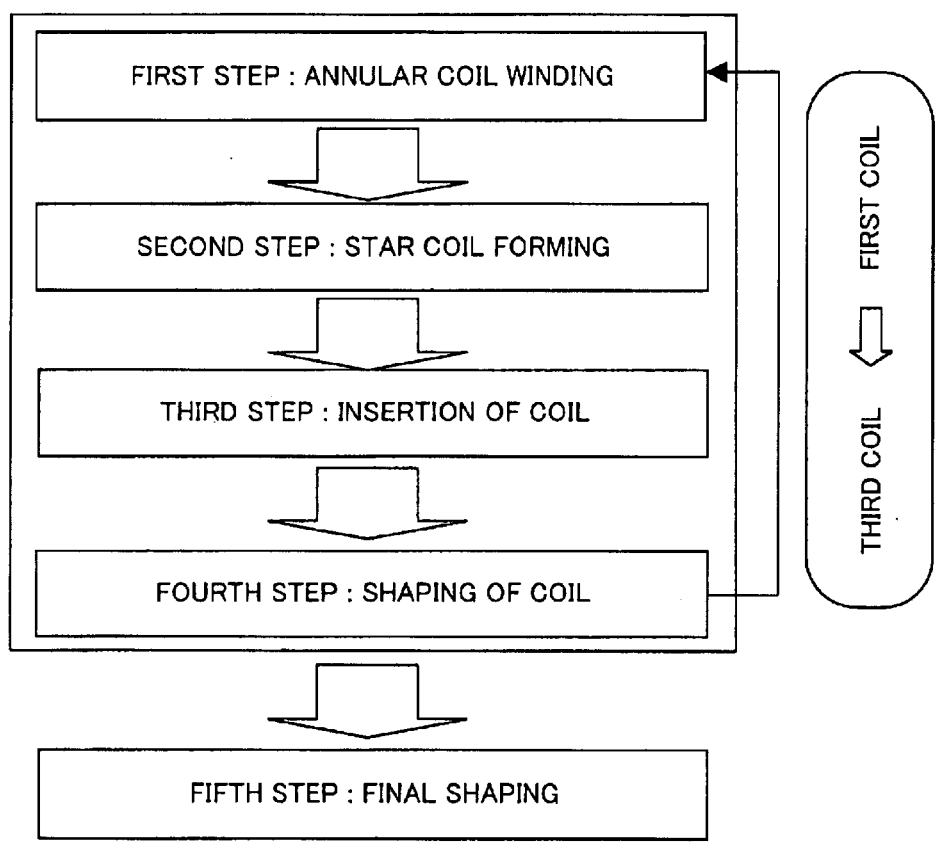
FIG. 6 is a diagram showing a process for manufacturing windings of a stator according to the present invention.

The process of manufacturing the windings on the stator consists mainly of five steps, as shown in FIG. 6.

Figure 7:
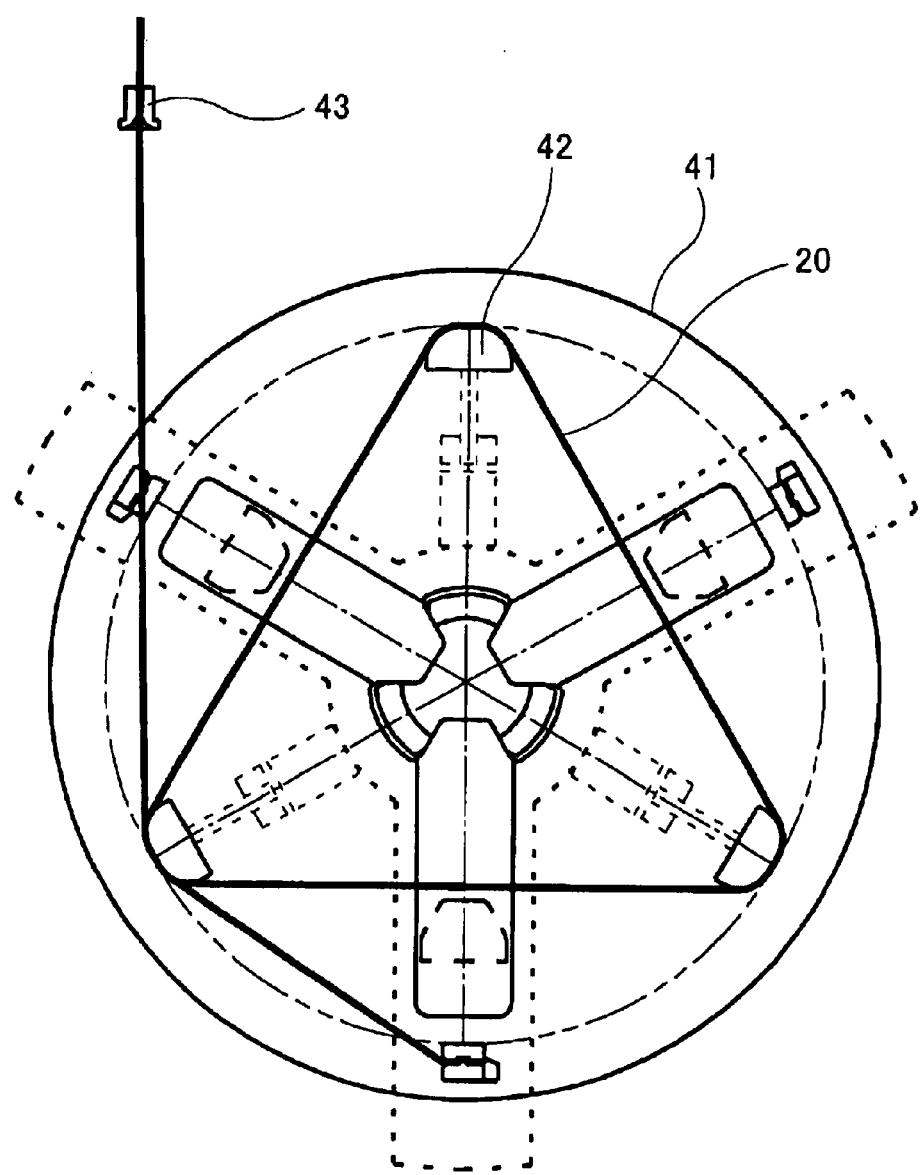
FIG. 7 is a diagram showing a process for forming six-pole eighteen-slot annular coil windings according to the present invention.

The first step is an annular coil winding step in which an annular winding is formed with respect to each phase. FIG. 7 shows an example of this step. A reel framework 41 is a rotor and has movable reel members 42. As the reel framework 41 rotates, a coil 20 supplied through a coil supply nozzle 43 is wound around the movable reel members 42 to form an annular coil. The setting of the length of the coil and the configuration of the coil in this step are important factors in obtaining a lower coil end.

Figure 8:
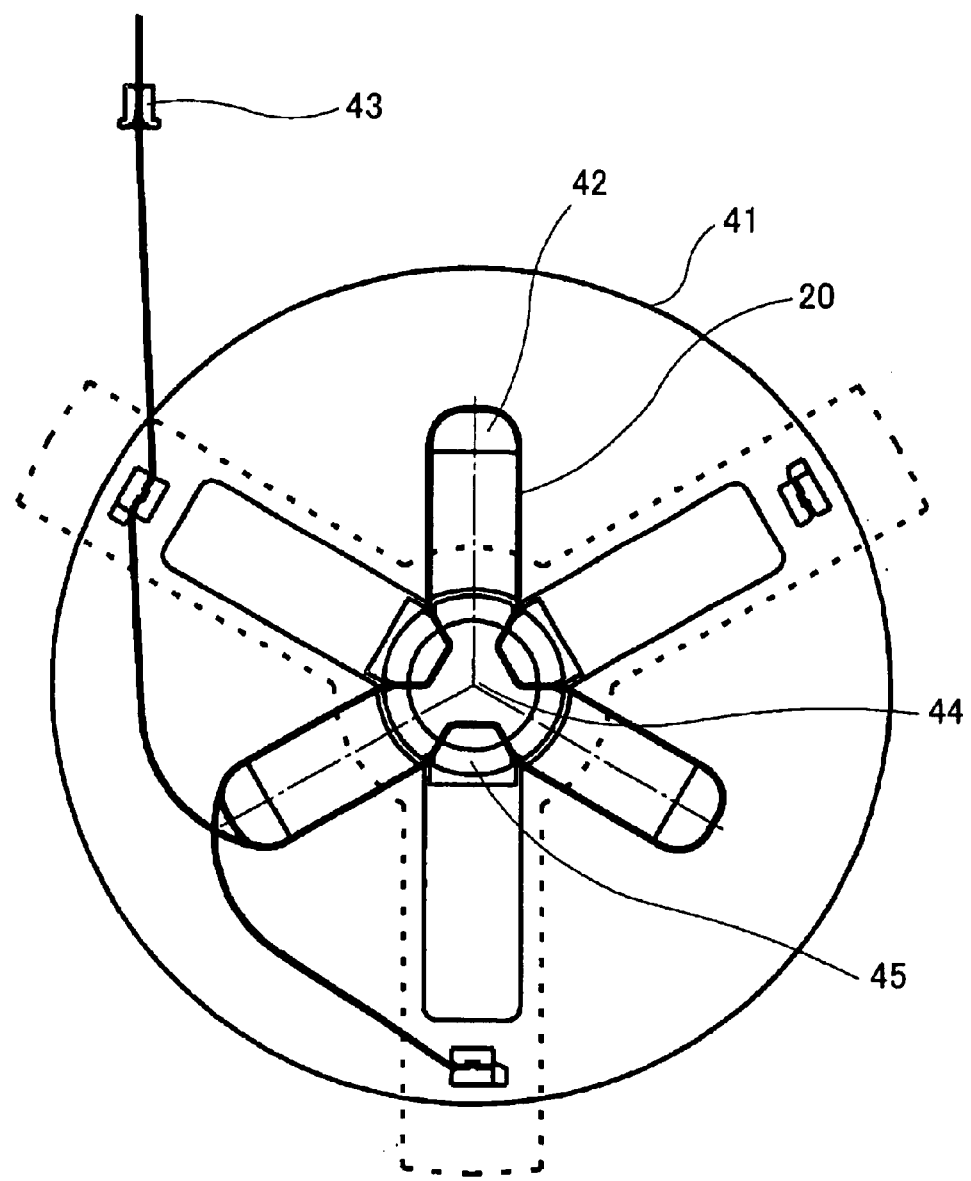
FIG. 8 is a diagram showing a process for forming six-pole eighteen-slot star coil windings according to the present invention is performed.

The second step is a star coil forming step in which the periphery of the annular coil formed in the first step is formed into a projecting/recessed shape. FIG. 8 shows an example of this step. Movable forming frame members 45 are inserted between the movable reel members 42 supporting the annular coil to inwardly press the annular coil in the radial direction from the outside of the coil. The coil is thereby pressed against a fixed forming frame 44 to be formed. When the movable forming frame members 45 are moved, the movable reel members 42 are moved in synchronization with the movement of the movable forming frame members 45 so that the coil tension is not reduced, thus forming a star coil without wire breaking and looseness.

The third step is a coil insertion step in which the above-described annular coil corresponding to one phase is inserted in slots formed in a stator core, the coil being inserted through slot openings of the slots for accommodating the wound annular coil. The coil formed in the above-described second step is inserted by being set on an insertion jig. The wave-shaped coil the length of which is limited for the purpose of obtaining a lower coil end and which has a high space factor has a larger insertion resistance and is difficult to insert in the insertion step. Therefore an insertion jig capable of insertion against the insertion resistance is used to insert the coil. Also, an insertion guide is used which is capable of maintaining the shape of wave-shaped coil end rising portions for facilitating shaping in the axial direction in the fifth step.

The fourth step is a coil shaping step in which the inserted coil is shaped to facilitate the next coil insertion. This step is indispensable for forming high-space-factor coils in multiple layers.

The above-described first to fourth steps are repeated three times to insert coils corresponding to three phases. In particular, the shaped state of the second coil 202 shaped in the fourth step, which is an essential factor in the above-described "coil arrangement of the present invention", affects the effect of the next step.

Figure 2:
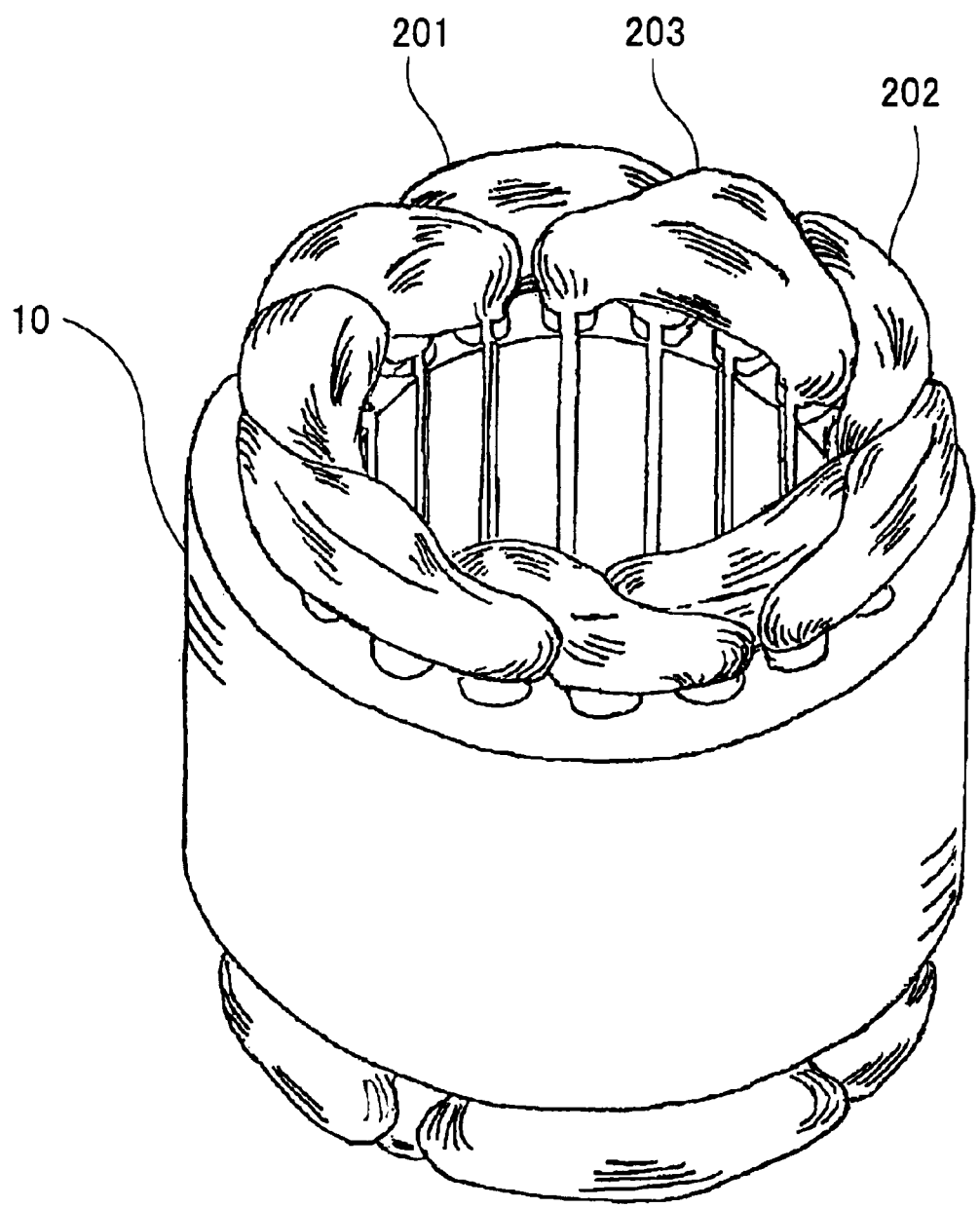
FIG. 2 is a diagram showing the three-phase full-pitch-winding brushless motor after shaping in an axial direction.

The fifth step is a final shaping step in which the coil ends of the inserted annular coils are shaped in the axial direction, and shaping is performed with a guide according to the specified values of the outside and inside diameters. The coils inserted and arranged as shown in FIG. 1 are shaped in the axial direction to have a configuration such as shown in FIG. 2. Thus, the coil ends can be shaped so as to be lower in height by the effects of the above-described "coil arrangement of the present invention" and the coil end rising structure of the wave-shaped coil in the inserter.

(Embodiment 4)

In Table 1 shown below, the entire heights of the coil ends from the stator core end surfaces in brushless motors having a stator core lamination thickness of 55 mm and a space factor of 65% in common, and differing in coil configuration from each other, i.e., the conventional brushless motor with full-pitch windings shown in FIG. 5, a product A of the present invention (a full-pitch-winding brushless motor having the "coil arrangement of the present invention") and a product B of the present invention (a full-pitch-winding brushless motor having the "coil arrangement of the present invention") are shown in such a manner that the coil end height in each product of the present invention is indicated as an index relative to the coil end height in the conventional product indicated as 100.

TABLE 1

|  | Conventional product | Product A of the present invention | Product B of the present invention |
| --- | --- | --- | --- |
| Coil End Height | 100 | 82 | 61 |

The difference in entire height among each coil ends indicate that the coil end height can be reduced from that in the conventional product by the effect of the present invention. The result of comparison between the conventional product and the product A of the present invention shows the effect directly produced from the "coil arrangement of the present invention", and the result of comparison between the product A of the present invention and the product B of the present invention shows a synergistic effect in the case where the coil region effect attained in the product A of the present invention is effectively used according to the structure specific to the coil end rising portion of the wave-shaped coil.

(Embodiment 5)

FIG. 2 shows the stator of a three-phase full-pitch-winding brushless motor having six poles and eighteen slots. As operation in a hermetic compressor, operation with a constant efficiency maintained in a necessary drive rotational speed range is required. The number of poles may be selected from 4, 6, and 8. There is a demand for specifications for high-speed rotation with respect to use in motor vehicles requiring a smaller compressor, and use of a motor having a smaller number of poles is more advantageous in this respect.

Figure 9:
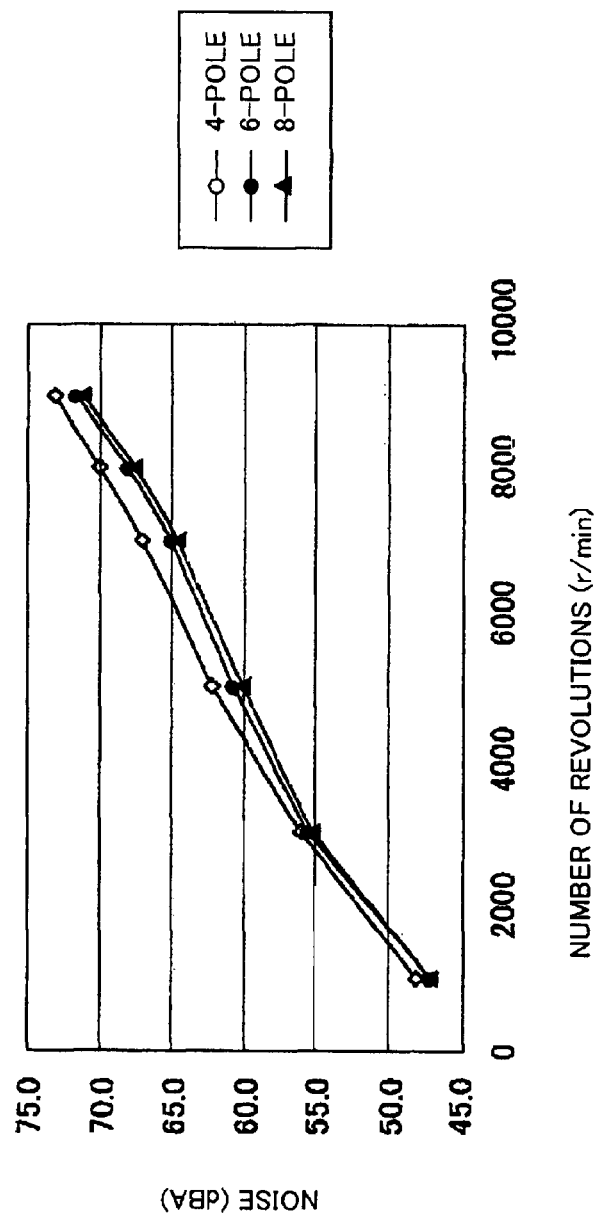
FIG. 9 is a diagram showing a relationship between the number of revolutions of a rotor and noise, for respective cases of different numbers of poles.

FIG. 9 is a diagram showing the relationship between the number of revolutions and noise with respect to the above-mentioned numbers of poles. FIG. 9 shows that vibration and noise are reduced if the number of poles is increased.

Figure 10:
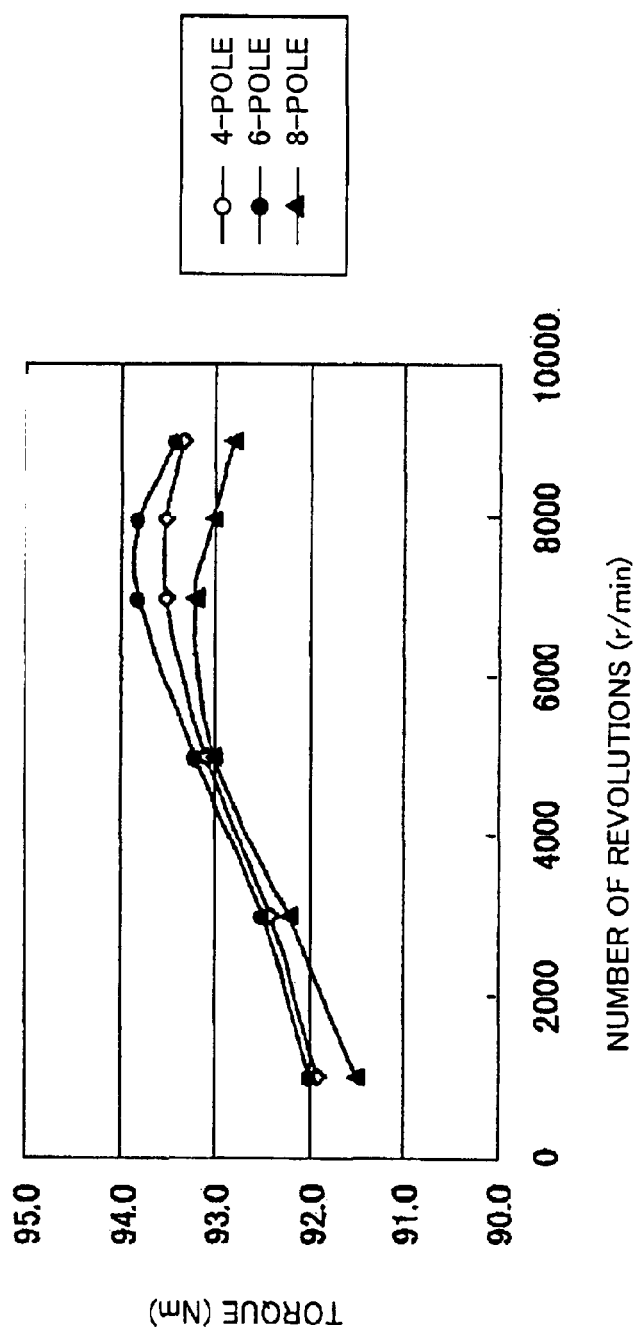
FIG. 10 is a diagram showing a relationship between the number of revolutions and torque, for respective cases of different numbers of poles.

However, if the number of poles is increased, the electrical frequency is increased and the iron loss at a higher speed is thereby increased, resulting in a reduction in efficiency (rated torque), as shown in FIG. 10.

Therefore, all of high-speed rotation, low vibration/noise and efficiency (rated torque) are taken into consideration. As a result, six poles are used. Also, it is preferable to use sinusoidal wave driving in combination with the 6-pole system in order to achieve a further reduction in vibration/noise.

Figure 11A:
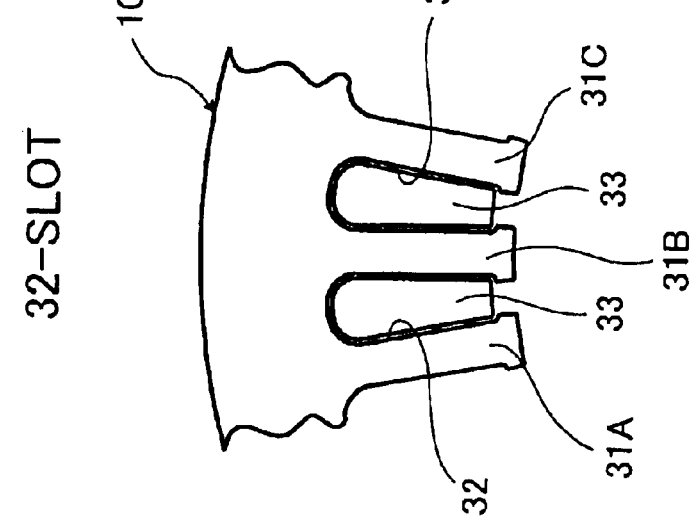
FIGS. 11a and 11b are diagrams showing slot shapes of stator cores, respectively having 18 slots and 36 slots.
Figure 11B:
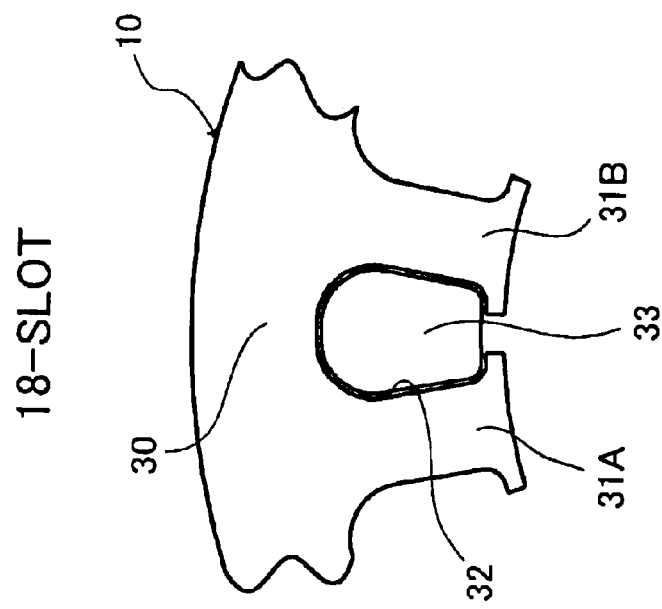
Figure 12:
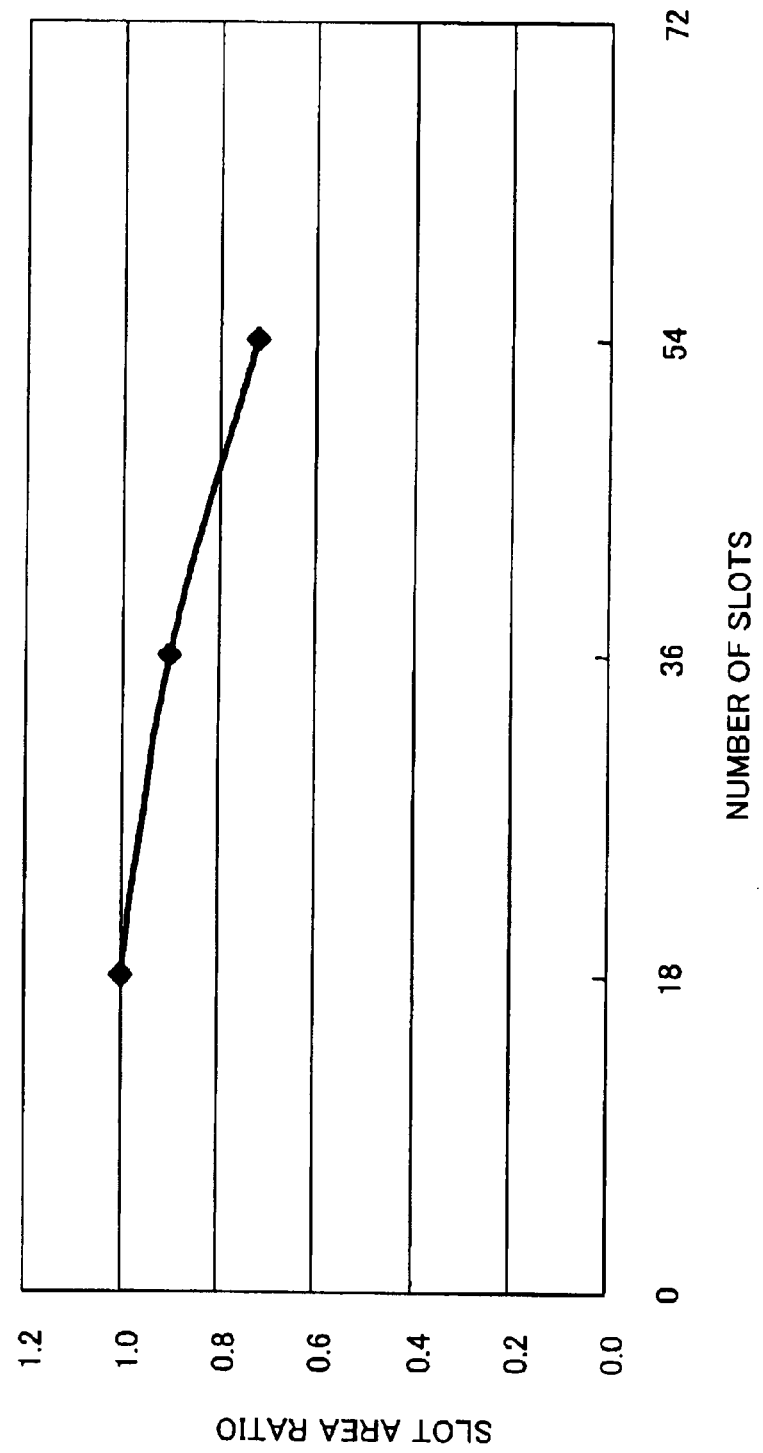
FIG. 12 is a diagram showing a relationship between the number of slots and effective area of the slots.

FIGS. 11a and 11b show slot configurations of 18-slot and 36-slot stator cores, and FIG. 12 shows the relationship between the number of slots for six poles and the effective slot area defined by subtracting the area of insulating material regions from the entire slot area. This relationship indicates that the effective slot area is larger if the number of slots is smaller.

Here, a stator core 10 comprises a yoke 30, teeth 31A, 31B, 31C, . . . , and slots 32 each formed between adjacent teeth. Coils are denoted by 33.

To optimize the effect with the windings in the case of operation with the above-mentioned efficiency, eighteen slots corresponding to the least number of slots for six-pole three-phase full-pitch windings are used. Minimizing the number of coil bundles is also effective in reducing interference between the coils to enable the formation of coil ends with improved shapability.

Such a small low-vibration/noise electric motor can be used most effectively when mounted in a restricted space in a machine which is required to have a low vibration/noise characteristic. For example, it is suitable for use in a hermetic compressor, for drive of an electric vehicle or a hybrid vehicle, or for a fan of an air conditioner.

(Embodiment 6)

Figure 13:
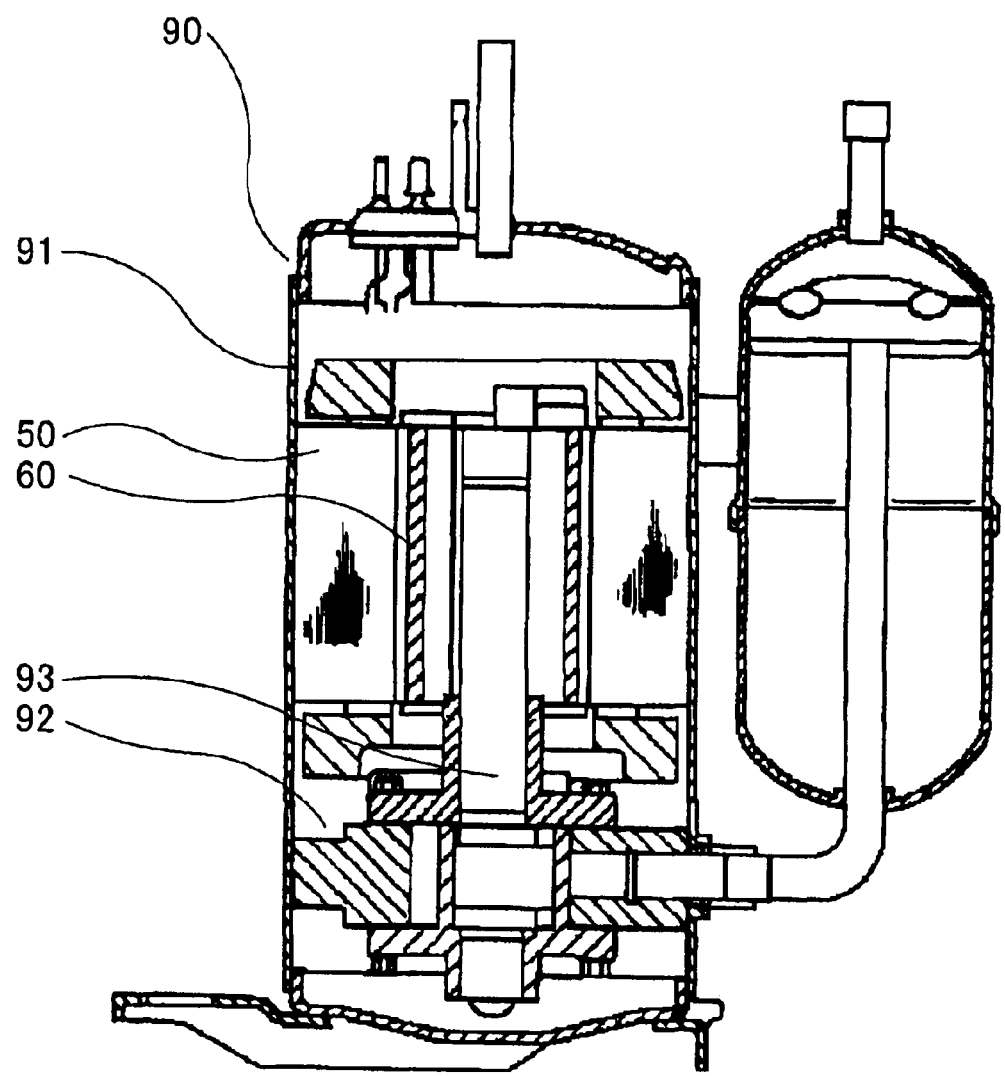
FIG. 13 is a cross-sectional view of a hermetic compressor including the brushless motor of the present invention.

FIG. 13 shows a hermetic compressor including the brushless motor of the present invention.

A hermetic compressor 90 is constituted by a housing 91 for maintaining the interior of the compressor in a hermetic state, a mechanism unit 92 for performing compression, a stator 50, and a rotor 60. The stator 50 is fixed in the housing 91 by shrinkage fitting or the like. The rotor 60 is fixed by shrinkage fitting or press fitting on a shaft 93 extending from the mechanism unit 92.

When the hermetic compressor 90 is operating, a refrigerant atmosphere exists in the housing 91 and a current leaks from the coil end 21 exposed to this atmosphere. The problem of the leak current from the coil end 21 is particularly serious if an R134 refrigerant is used, since electrical conductivity of the R134a refrigerant is markedly higher than that of the conventional R12 refrigerant.

In a brushless motor having a reduced coil end height as in the present invention, the area of the surfaces exposed to the R134a refrigerant is reduced and the leak current can be reduced in proportion to the reduced surface area.

If the hermetic compressor is required to have a further improved low-vibration/noise characteristic, the brushless motor may be driven by sinusoidal wave driving to realize a further improved low-vibration/noise characteristic without largely increasing the leak current.

As described above, the brushless motor of the present invention has coil ends shaped in the axial direction, so that the height of the coil ends in the axial direction can be reduced and the size of the brushless motor can therefore be reduced.

The coil arrangement of the present invention enables shaping regions for the entire coils to be increased, thus making it possible to further reduce the height of the coil ends in the axial direction. This effect can be further improved if the coils are formed as wave coils.

In the hermetic compressor including the above-described brushless motor, the leak current from the coil ends of the brushless motor is small because of the reduced height of the coil ends in the axial direction and, therefore, the space for insulation from the hermetically sealed housing can be reduced. As a result, the size of the hermetic compressor can be reduced. This advantage is particularly noticeable in the case where the R134a refrigerant having a higher electrical conductivity is used.

If an hermetic compressor of low vibration/noise in particular is required, the brushless motor may be driven by sinusoidal wave driving. Thus, an hermetic compressor having a further improved low-vibration/noise characteristic can be realized without largely increasing the leak current.

Further, a fan for an air conditioner, a refrigerator, a motor vehicle or any other machine having the brushless motor or the hermetic compressor having the above-described advantages can be formed in a reduced size and can have an improved low-vibration/noise characteristic.

What is claimed is:

1. A brushless motor having full-pitch windings in three phases, said motor comprising a rotor and a stator, said stator having an axial direction, the stator comprising a stator core comprising a plurality of coils, a yoke, teeth, and slots each located between a pair of adjacent teeth, the teeth being three times in number of poles of the rotor, wherein each of said coils of each phase is located in one of the slots in a one coil per one slot manner, the coils each having coil ends shaped in the axial direction of the stator, wherein the coil ends of each coil of said plurality of coils corresponding to a phase are located at an end surface of the stator core such that: a first coil is located outside the second and third coils, in a place where the second and third coils are located in a pair of slots adjacent each other; the second coil is located from inside the first coil to outside the third coil, in a place where the first and third coils are located in another pair of slots adjacent each other; and the third coil is located inside the first and second coils, in a place where the first and second coils are located in still another pair of slots adjacent each other.

2. The brushless motor according to claim 1, wherein the coils are full-pitch wound coils.

3. The brushless motor according to claim 1, wherein the rotor has six poles and the stator has eighteen slots.

4. The brushless motor according claim 2, wherein the rotor has six poles and the stator has eighteen slots.

5. The brushless motor according to claim 1, wherein the motor is driven by sinusoidal wave driving.

6. The brushless motor according to claim 2, wherein the motor is driven by sinusoidal wave driving.

7. The brushless motor according to claim 3, wherein the motor is driven by sinusoidal wave driving.

8. A machine including the brushless motor according to claim 1.

9. A machine including the brushless motor according to claim 2.

10. A machine including the brushless motor according to claim 3.

11. A machine including the brushless motor according to claim 4.

12. An hermetic compressor including the brushless motor according to claim 1.

13. An hermetic compressor including the brushless motor according to claim 2.

14. An hermetic compressor including the brushless motor according to claim 3.

15. An hermetic compressor including the brushless motor according to claim 5.

16. The hermetic compressor according to claim 12, wherein a refrigerant used in the hermetic compressor is R134a.

17. The hermetic compressor according to claim 12, wherein the coils of the brushless motor are formed by full-pitch winding and a refrigerant used in the hermetic compressor is R134a.

18. The hermetic compressor according to claim 12, wherein the coils of the brushless motor are formed by full-pitch winding.

19. A machine including the hermetic compressor according to claim 12.

20. A machine including the hermetic compressor according to claim 16.

21. The machine according to claim 20, wherein the coils of the brushless motor are formed by full-pitch winding.

* * * * *